US009387494B2

(12) United States Patent
Sesser et al.

(10) Patent No.: US 9,387,494 B2
(45) Date of Patent: Jul. 12, 2016

(54) SPRINKLER WITH MULTI-FUNCTIONAL, SIDE-LOAD NOZZLE INSERT WITH BALL-TYPE VALVE

(71) Applicant: Nelson Irrigation Corporation, Walla Walla, WA (US)

(72) Inventors: George L. Sesser, Walla Walla, WA (US); Sean M. Scott, Walla Walla, WA (US)

(73) Assignee: NELSON IRRIGATION CORPORATION, Walla Walla, WA (US)

( * ) Notice: Subject to any disclaimer, the term of this patent is extended or adjusted under 35 U.S.C. 154(b) by 229 days.

(21) Appl. No.: 14/050,610

(22) Filed: Oct. 10, 2013

(65) Prior Publication Data

US 2015/0102125 A1 Apr. 16, 2015

(51) Int. Cl.

| | |
|---|---|
| ***B05B 1/16*** | (2006.01) |
| ***F16K 5/10*** | (2006.01) |
| ***F16K 11/085*** | (2006.01) |
| ***F16K 1/14*** | (2006.01) |
| ***B05B 1/26*** | (2006.01) |
| ***B05B 1/30*** | (2006.01) |

(52) U.S. Cl.

CPC ............... *B05B 1/1636* (2013.01); *B05B 1/265* (2013.01); *B05B 1/3026* (2013.01)

(58) Field of Classification Search

CPC ...... B05B 1/16; B05B 1/1627; B05B 1/1636; B05B 1/1645; B05B 1/1654; F16K 5/10; F16K 11/085; F16K 1/14

USPC ......................... 239/436, 391–395, 113–117; 251/129.14, 315.16, 315.11, 315.14, 251/315.15, 315.17, 315.18, 207, 89, 114, 251/115; 137/315.17, 315.18, 625.47, 137/625.46

See application file for complete search history.

(56) References Cited

U.S. PATENT DOCUMENTS

| | | |
|---|---|---|
| 2,060,943 A | 11/1936 | Lieb |
| 2,281,229 A | 4/1942 | Bullock |
| 2,918,200 A | 12/1959 | Libit et al. |

(Continued)

FOREIGN PATENT DOCUMENTS

| | | |
|---|---|---|
| DE | 3719438 A1 | 12/1988 |
| DE | 4401488 A1 | 7/1995 |
| JP | 05277406 | 10/1993 |

OTHER PUBLICATIONS

U.S. Appl. No. 13/927,992, filed Jun. 26, 2013.

(Continued)

*Primary Examiner* — Arthur O Hall
*Assistant Examiner* — Joseph A Greenlund
(74) *Attorney, Agent, or Firm* — Nixon & Vanderhye P.C.

(57) ABSTRACT

A sprinkler and side-loading nozzle insert assembly includes a sprinkler body provided with a flow passage, a bearing housing in a side wall of the sprinkler body, and a nozzle insert received in an access opening formed in the side wall of the sprinkler body substantially opposite the bearing housing. The nozzle insert includes an insert body having a bearing portion received in the bearing housing, a ball-valve portion connected to the bearing portion and provided with a nozzle bore having an inlet and an outlet orifice, and a lock/release portion connected to the ball-valve portion, the lock/release portion including plural, flexible spring arms extending away from the ball-valve portion. The nozzle insert is rotatable to plural operating positions by manipulation of the spring arms.

22 Claims, 20 Drawing Sheets

(56) References Cited

U.S. PATENT DOCUMENTS

| | | | | |
|---|---|---|---|---|
| 3,563,463 | A | 2/1971 | Walker | |
| 4,023,773 | A * | 5/1977 | Wise | F16K 5/0605 251/148 |
| 4,157,163 | A | 6/1979 | Pinto et al. | |
| 4,801,089 | A | 1/1989 | Zeman | |
| 4,819,872 | A | 4/1989 | Rosenberg | |
| 5,039,016 | A * | 8/1991 | Gunzel, Jr. | B05B 7/2448 222/484 |
| 5,211,335 | A | 5/1993 | Strid | |
| 5,234,169 | A | 8/1993 | McKenzie | |
| 5,253,807 | A | 10/1993 | Newbegin | |
| 5,335,859 | A | 8/1994 | Thayer et al. | |
| 5,411,350 | A | 5/1995 | Breault | |
| 5,456,411 | A | 10/1995 | Scott et al. | |
| 5,487,507 | A | 1/1996 | McDonald et al. | |
| 5,560,548 | A | 10/1996 | Mueller et al. | |
| 5,588,595 | A * | 12/1996 | Sweet | B05B 3/008 239/222.11 |
| 5,699,962 | A | 12/1997 | Scott et al. | |
| 5,727,739 | A | 3/1998 | Hamilton | |
| 5,749,528 | A | 5/1998 | Carey et al. | |
| 5,762,269 | A | 6/1998 | Sweet | |
| 5,820,025 | A | 10/1998 | Troudt | |
| 5,832,959 | A * | 11/1998 | Szymczakowski | A61M 39/223 137/556 |
| 5,884,847 | A | 3/1999 | Christopher | |
| 5,899,384 | A | 5/1999 | Solbakke | |
| 6,234,411 | B1 | 5/2001 | Walker et al. | |
| 6,244,527 | B1 | 6/2001 | Ferrazza et al. | |
| 6,398,128 | B1 | 6/2002 | Hamilton et al. | |
| 6,405,902 | B2 | 6/2002 | Everett | |
| 6,447,027 | B1 | 9/2002 | Lilley et al. | |
| 6,616,065 | B2 | 9/2003 | Martin | |
| 6,669,120 | B2 | 12/2003 | Vernia | |
| 6,676,038 | B2 | 1/2004 | Gressett, Jr. et al. | |
| 6,702,198 | B2 * | 3/2004 | Tam | B05B 15/0283 239/104 |
| 6,749,134 | B2 | 6/2004 | Arenson et al. | |
| 6,772,964 | B2 | 8/2004 | Funseth et al. | |
| 6,871,795 | B2 | 3/2005 | Anuskiewicz | |
| 6,880,768 | B2 | 4/2005 | Lau | |
| 7,328,853 | B2 | 2/2008 | Carey et al. | |
| 7,431,346 | B2 | 10/2008 | Frost et al. | |
| 7,472,840 | B2 | 1/2009 | Gregory | |
| 7,644,877 | B2 | 1/2010 | Drechsel | |
| 7,980,490 | B2 | 7/2011 | Waddelow et al. | |
| 8,584,969 | B2 * | 11/2013 | Drechsel | B05B 3/003 239/222 |
| 2004/0217196 | A1 | 11/2004 | Yurek, Jr. et al. | |
| 2007/0131792 | A1 | 6/2007 | Gardner et al. | |
| 2009/0200796 | A1 | 8/2009 | Lai | |
| 2009/0321543 | A1 | 12/2009 | Lawyer et al. | |
| 2010/0025983 | A1 | 2/2010 | Rosch et al. | |
| 2010/0102149 | A1 | 4/2010 | Lawyer et al. | |
| 2010/0108783 | A1 | 5/2010 | Joseph et al. | |
| 2012/0312904 | A1 | 12/2012 | Lawyer et al. | |
| 2015/0001312 | A1 * | 1/2015 | Sesser | B05B 1/326 239/113 |

OTHER PUBLICATIONS

U.S. Appl. No. 14/049,633, filed Oct. 9, 2013.
U.S. Appl. No. 13/927,957, filed Jun. 26, 2013.

* cited by examiner

SPRINKLER WITH MULTI-FUNCTIONAL, SIDE-LOAD NOZZLE INSERT WITH BALL-TYPE VALVE

This invention relates to sprinklers especially suited for, but not limited to, agricultural sprinklers used on center-pivot irrigation machines.

BACKGROUND

Center-pivot irrigation machines include large truss spans supported on wheeled towers that rotate about a center support. The truss spans mount many sprinklers along the length of the spans, either directly or suspended from the trusses on rigid or flexible drop hoses.

Because sprinklers of this type (and particularly the sprinkler nozzles) are oftentimes exposed to unfiltered or poorly filtered water containing sand, dirt, debris, etc., it is necessary to periodically clean or flush the individual sprinklers including the sprinkler nozzle bores. At the same time, it is necessary to install nozzles of different orifice size along the truss span length to obtain the desired flow rate in light of the different circle diameters traced by the individual sprinklers as the machine rotates about its center support. Flushing and/or changing nozzle size generally requires at least some disassembly of the sprinkler (and possibly shutting down the machine), which, multiplied over tens or even hundreds of sprinklers, is labor intensive, time consuming and therefore costly.

The present invention seeks to simplify the nozzle changeover and/or flush operations by providing a multi-functional, side-loading nozzle insert with a ball-type valve that is (1) easily installed and removed thereby facilitating nozzle changeover; and (2) when installed, easily rotated between, for example, "ON", "OFF", and nozzle "FLUSH" operating positions.

BRIEF SUMMARY OF THE INVENTION

In one exemplary but nonlimiting embodiment, the invention relates to a nozzle insert for side-loading into a complementary access opening in a sprinkler body comprising an insert body having a bearing portion, a part-spherical ball-valve portion connected to the bearing portion and provided with a nozzle bore; and a lock/release portion connected to the part-spherical ball-valve portion including plural, flexible spring arms extending away from the part-spherical ball-valve portion.

In another version, the invention relates to a sprinkler and side-loading nozzle insert assembly comprising a sprinkler body provided with a flow passage, a bearing housing in a side wall of the sprinkler body, and a nozzle insert received in an access opening formed in the side wall of the sprinkler body substantially opposite the bearing housing, the nozzle insert comprising an insert body having a bearing portion received in the bearing housing, a ball-valve portion provided with a nozzle bore having an inlet and an outlet orifice, the ball-valve portion connected to the bearing portion, and a lock/release portion connected to the ball-valve portion, the lock/release portion including plural, flexible spring arms extending away from the ball-valve portion; wherein the nozzle insert is rotatable to plural operating positions by manipulation of the spring arms, and wherein the nozzle bore is alignable with the flow passage in at least two of the plural operating positions.

In another aspect, the invention relates to a sprinkler comprising a sprinkler body having an axis defining a flow passage extending therethrough, and a nozzle insert having a ball-valve portion formed with a nozzle bore having an inlet and a diametrically-opposed outlet orifice, and diametrically opposed solid surfaces; the nozzle insert adapted for insertion into an access opening formed in a side wall of the sprinkler body at an acute angle relative to the axis and pivotable upwardly into a releasably locked position with the ball-valve portion oriented relative to the flow passage in any one of four operating positions including a nozzle ON operating position where the nozzle inlet is located adjacent the flow passage, a nozzle FLUSH operating position where the outlet orifice is located adjacent the flow passage; and at least one nozzle OFF operating position where one of the diametrically-opposed solid surfaces is located adjacent the flow passage.

The invention will now be described in greater detail in connection with the drawings identified below.

DETAILED DESCRIPTION OF THE DRAWINGS

Figure 1:
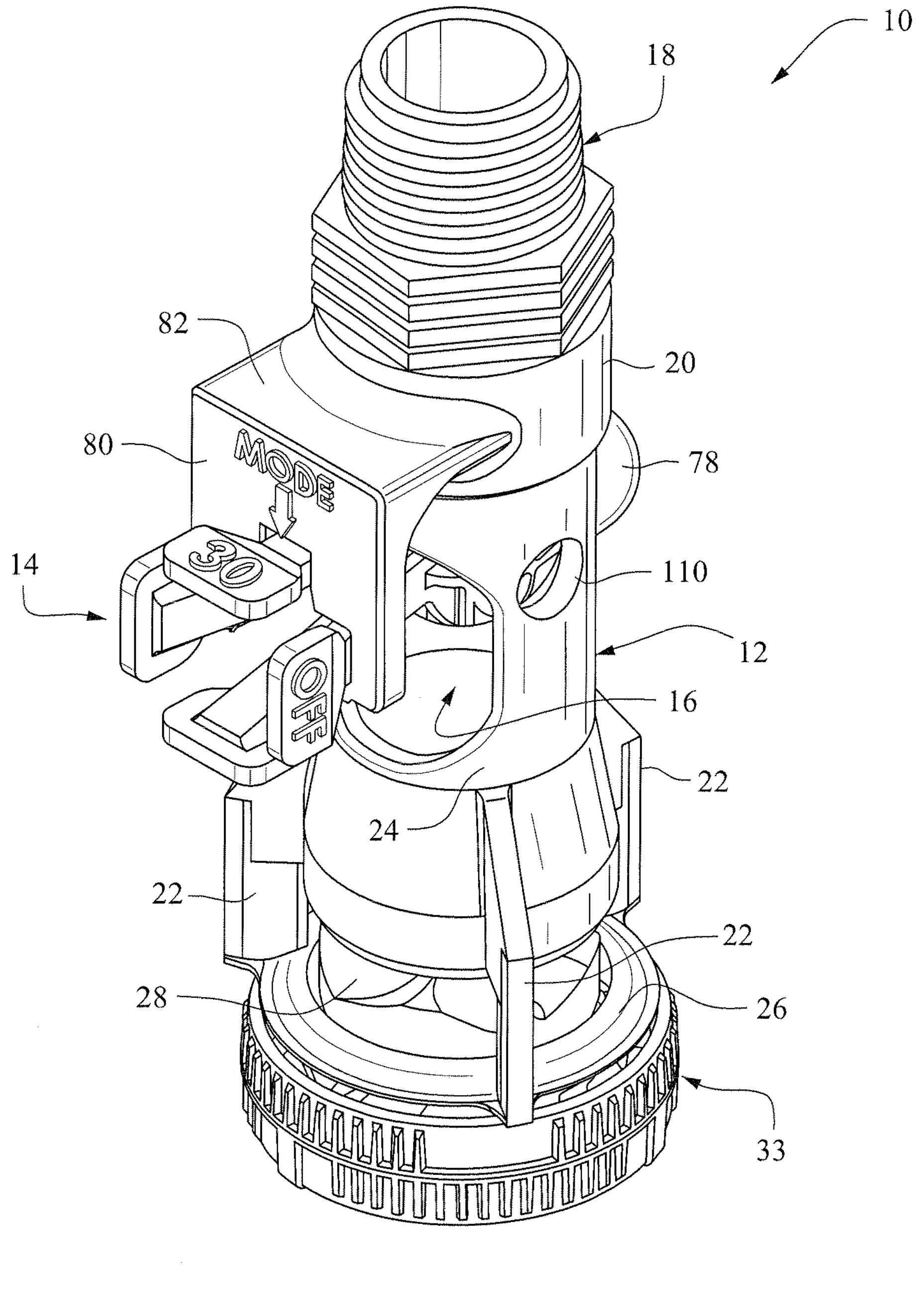
FIG. 1 is a perspective view of a sprinkler in accordance with a first exemplary but nonlimiting embodiment, showing the nozzle insert located within the sprinkler body in the ON operating position.
Figure 2:
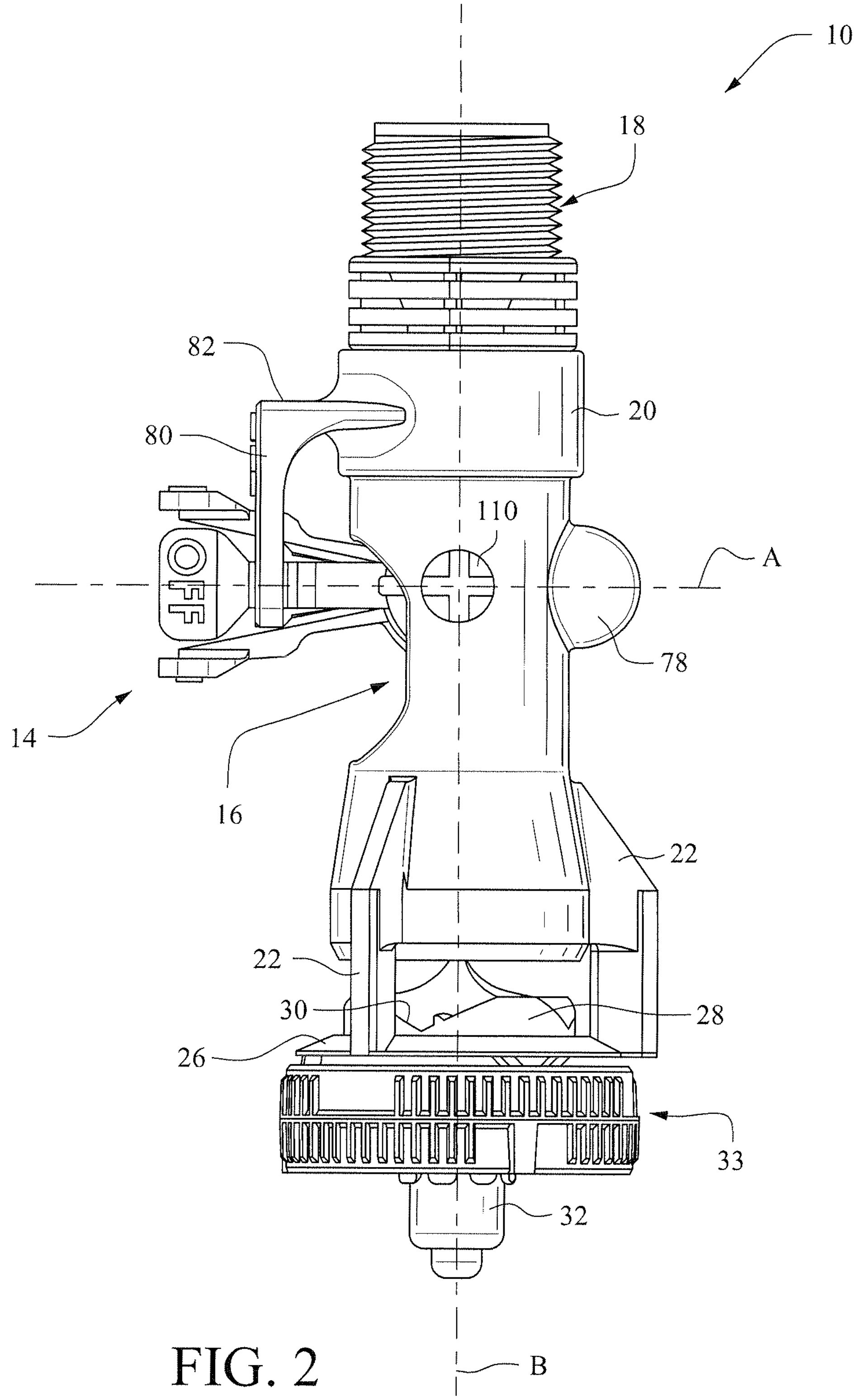
FIG. 2 is a right side elevation view of the sprinkler shown in FIG. 1.

FIG. 1 illustrates a sprinkler assembly 10 that includes a sprinkler body 12 and a nozzle insert 14 receivable within a sideways-oriented, complementary access opening 16 provided in the side wall of the sprinkler body 12. The sprinkler body 12 mounts a conventional adapter 18 via a threaded coupling at the upstream end 20 of the sprinkler body. A plurality of support struts 22 are provided at the downstream end 24 of the sprinkler body, the support struts connected to a mounting ring 26 adapted for securing a conventional water deflector or distribution plate 28 formed with grooves 30 (FIG. 2) that typically cause the plate to rotate when impinged upon by a stream emitted from the sprinkler nozzle. The plate 28 may incorporate an otherwise conventional viscous brake or rotational speed-retarding device 32 (FIG. 2). It will be understood that the plate 28 and speed-retarding device 32 are part of a cap assembly 33 (not shown in all views of the sprinkler body) that attaches to the mounting ring 26.

Before describing the nozzle insert 14 and sprinkler body 12 in detail, it is important to note that any references to relative terms such as "upper", "lower", "left-side", "right-side", "front" and "rear", relate to the sprinkler body 12 and nozzle insert 14 as oriented in the various figures and are not intended to be in any way limiting, because the sprinkler may assume other orientations in use. Since, however, the sprinkler will generally assume the orientation shown in FIG. 1 or a reverse (inverted) orientation, it is appropriate to refer to the nozzle insert 14 as a "side-loading" nozzle insert.

With reference especially to FIGS. 4-7, the nozzle insert 14 is formed to include an insert body 34 which includes a bearing portion 36, a ball-valve portion 38 and a lock/release portion 40 made up of four flexible spring arms 42, 44, 46 and 48. The nozzle insert 14 is preferably injection-molded of hard plastic material such as PVC (or other suitable plastic or metal material). The insert body 34 has a longitudinal center axis A (FIGS. 2 and 4), that, when installed in the sprinkler body (FIG. 1), is substantially perpendicular to a longitudinal center axis B (FIG. 2) of the sprinkler body.

The bearing portion 36 of the insert body 34 has a part-spherical bearing surface 50 and a tapered or narrowed annular connecting surface 52 that joins the bearing portion 36 to the ball-valve portion 38.

The ball-valve portion 38 is formed with substantially flat, diametrically-opposed sides 54, 56 that define an inlet and an outlet to a nozzle bore 58. More specifically, the bore 58 has an inlet rim 60 at side 54 and a smaller-diameter outlet or orifice 62 at side 56. Thus the bore 58 tapers from the larger-diameter inlet 60 to the smaller-diameter orifice 62, which is surrounded by a radially-spaced, outer rim 64 of the same diameter as the inlet rim 60 (see, for example, FIGS. 6 and 7). The spherical surfaces surrounding the rims 60 and 64 are adapted to engage a seal provided in the sprinkler body 12 when the nozzle insert 14 is in either the ON operating position or the nozzle FLUSH operating position as described further below. The ball-valve portion 38 is otherwise formed by a flat annular ring 66 and plural spaced ribs 68 (not all labeled) that define the generally part-spherical shape of the remaining outer surfaces of the ball-valve portion. These ribs extend into and shape the bearing portion 36 as well and, in addition to manufacturing considerations, provide ample space for flushing any debris that may engage the outer surfaces of the nozzle insert when installed within the sprinkler body as described in further detail below. On the diametrically-opposed solid sides of the ball-valve portion, annular ribs with spherical outer surfaces 69 are also provided for sealing purposes as also described further below.

The lock/release portion 40 is formed by the four flexible spring arms 42, 44, 46 and 48 that extend angularly away from the ball-valve portion 38 in a direction opposite the bearing portion 36. The spring arms are equally spaced at 90-degree intervals about the axis A and are substantially identical with the exception of indicia provided on squeeze tabs 70, 72, 74 and 76 provided at the distal ends of the respective spring arms. The indicia on the squeeze tabs cooperate with a "MODE" indicator (see, for example, FIGS. 1 and 3) on the sprinkler body to alert the user to the selected operating position of the nozzle insert. Thus, in the illustrated embodiment, the squeeze tab 70 and its spring arm 42 are aligned with the nozzle inlet rim 60 (see FIG. 4) and the squeeze tab is provided with a nozzle orifice size number (size "30" for this nozzle insert). When tab 70 and spring arm 42 are aligned with the MODE indicator, the user will understand that the nozzle insert is in the ON operating position. It will be appreciated that the squeeze tab 70 could also be provided with ON indicia and the nozzle orifice size number could be located elsewhere on the nozzle insert. In any event, for ease of understanding, when the nozzle size number is aligned with the MODE indicator, the nozzle insert will be referred to herein as being in the nozzle ON operating position. The squeeze tab and its spring arm 46 are aligned with the nozzle orifice 62 (see FIG. 7) and the squeeze tab 74 is provided with FLUSH indicia indicating, when aligned with the MODE indicator, that the nozzle is inverted relative to the ON operating position, and thus in position to be flushed by water entering the orifice 62 and expanding through the nozzle bore 58. The remaining diametrically-opposed squeeze tabs 72, 76 (and respective spring arms 44, 48) are aligned with the respective solid portions (specifically, the annular ribs or surfaces 69) of the ball-valve portion, and are provided with OFF indicia indicating, when aligned with the MODE indicator, that the nozzle bore 58 is oriented away from the flow passage in the sprinkler body, with one or the other of the annular ribs or surfaces 69 engaged with the seal at the flow passage outlet to thereby prevent water from entering the nozzle bore. In the illustrated embodiment, the nozzle bore 58 is oriented transverse to the flow passage when in either of two available OFF operating positions.

The spring arms 42, 44, 46 and 48 also serve to lock the nozzle insert 14 in the selected operating position within the sprinkler body 12. They also enable release and rotation of the nozzle insert to a new selected operating position as further described herein, following a detailed description of the sprinkler body 12.

With reference now to FIGS. 1-3 and 8, the sprinkler body 12 is generally cylindrical with a slight outward taper where the struts 22 are joined to the body. A bearing housing 78 in the form of a hollow, bulbous projection is formed in the side wall of the sprinkler body, substantially diametrically opposed to the access opening 16. The bearing housing 78 is adapted to receive and engage the bearing surface 50 of the bearing portion 36 of the nozzle insert. In this regard, note that the interior surface of the bearing housing 78 is substantially complementary to the part-spherical bearing surface 50. The sprinkler body access opening 16 has a generally rounded, rectangular shape, providing ample space for receiving the bearing and ball-valve portions 36, 38, respectively, of the nozzle insert 14. A lock plate 80, supported by a flange 82 (FIGS. 1-3) extending from the upper end 20 of the sprinkler body 12, projects downwardly to partially overlap the access opening 16. The plate 80 is formed with a multi-pronged opening 84 (best seen in FIGS. 3 and 8) defined by three retention slots 86, 88 and arrayed about an open lower end (located laterally between the slots 86, 88). Note that the MODE indicator is provided on the plate 80 adjacent the vertically-oriented slot 90 and points toward the center of the opening 84.

As best seen in, for example, FIGS. 10-13, the sprinkler body 12 is fitted at its inlet end 20 with a seal retainer sleeve 92 that extends into the adaptor 18 and that defines a flow passage 94 which extends through the sprinkler body. An o-ring 93 may be utilized to seal the sleeve/adaptor interface. The sleeve 92 is provided with an annular groove 96 at its lower end (i.e., the outlet end of flow passage 94) that cooperates with a complementary groove in a retainer ring 98 supported on a flange 100 on the sprinkler body to mount a relatively soft, flexible seal 102. Seal 102 may be characterized as a "double o-ring" seal including joined inner and outer rings 104, 106, which enable secure attachment about the outer ring 106, while allowing flexing of the inner ring 104 to conform to the surfaces of the insert body 34 in the various operating positions, i.e., the spherical surfaces surrounding the rims 60 and 64 and annular ribs or surfaces 69. The relatively soft, flexible material provides an effective seal with only a light compression force. Traditional ball and plug valves use hard seals with high compression loads required to effect the seal, resulting in a further need for a relatively large and otherwise undesirable handle to overcome the friction.

The sprinkler body 12 may also be provided with aligned apertures 108, 110 (see, for example, FIGS. 1, 3, 8 and 13) which align with the nozzle insert bore 58 when the nozzle insert is rotated to either of the two available OFF operating positions, thus permitting manual cleaning of the nozzle bore, as described further below.

Operation

Figure 3:
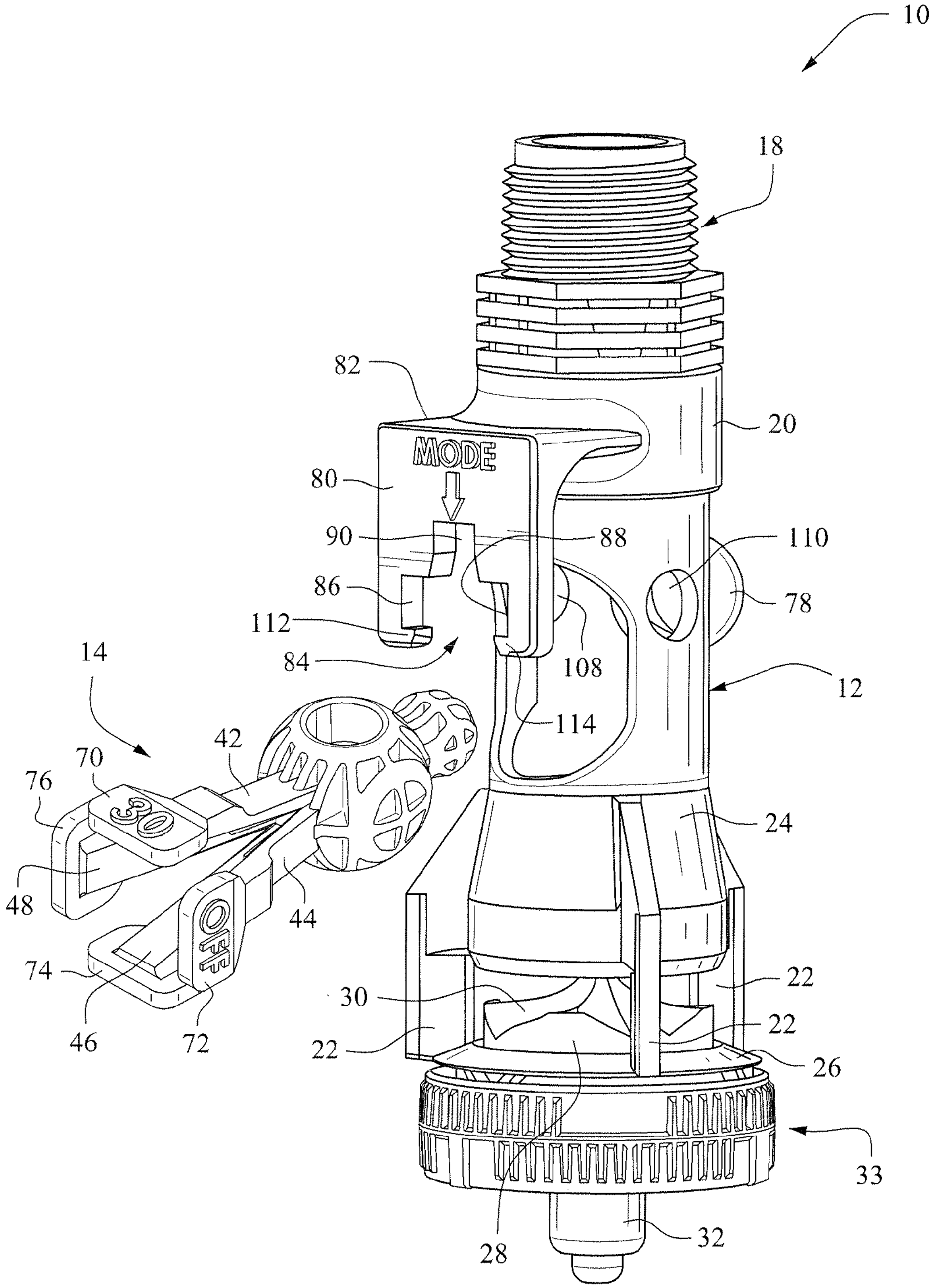
FIG. 3 is a perspective view of the sprinkler shown in FIGS. 1 and 2, but with the nozzle insert removed from the sprinkler body.
Figure 4:
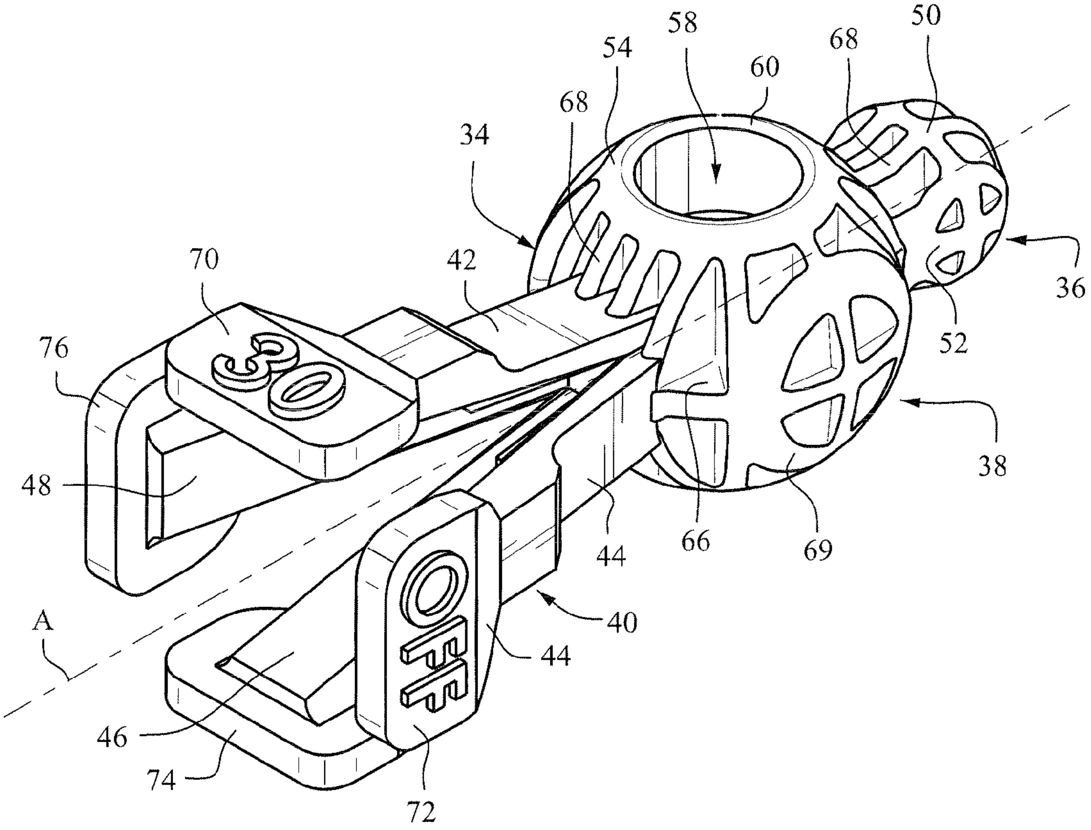
FIG. 4 is a right side, top perspective view of the nozzle insert shown in FIG. 3.
Figure 5:
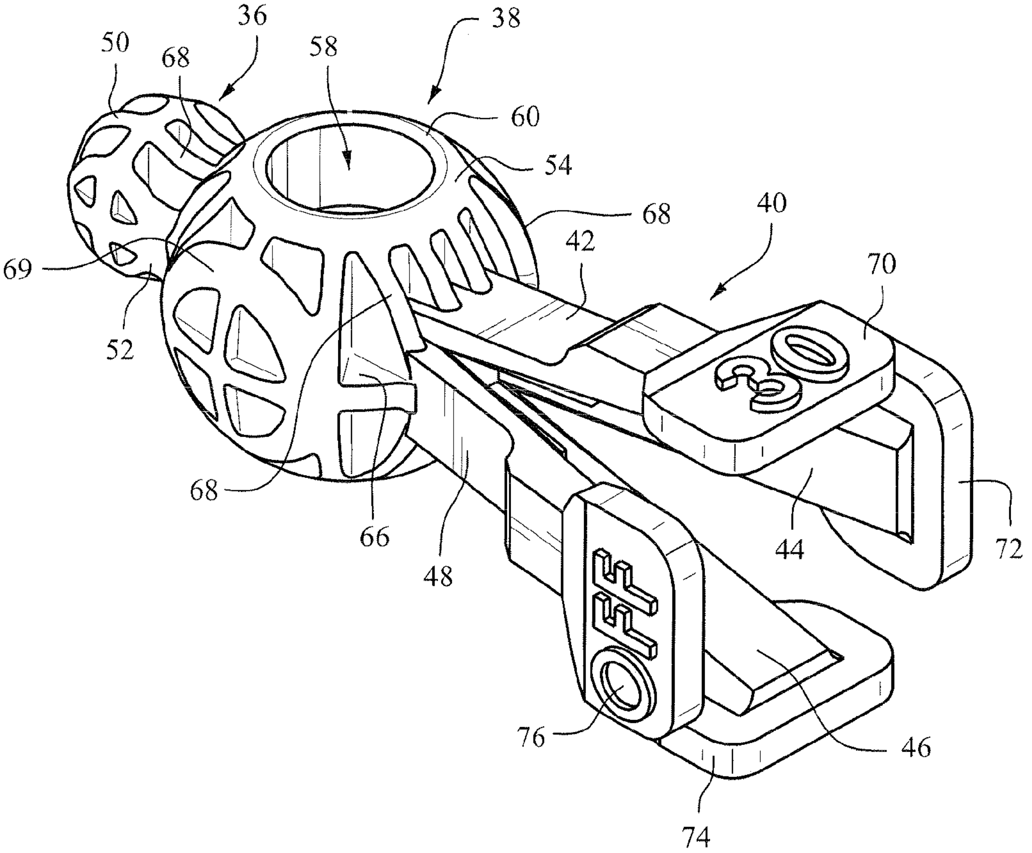
FIG. 5 is a left side, top perspective view of the nozzle insert shown in FIGS. 3 and 4.
Figure 6:
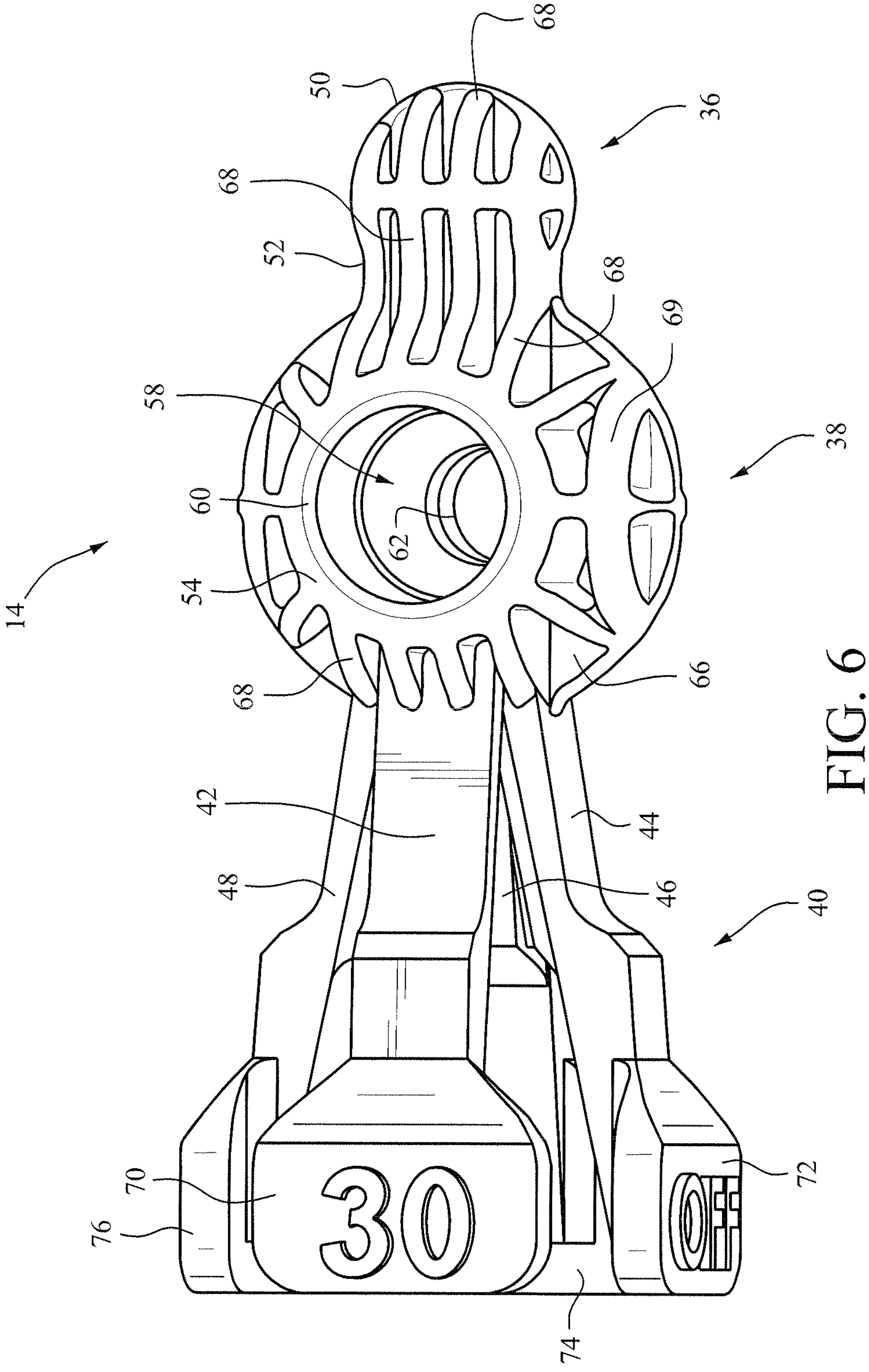
FIG. 6 is a top view of the nozzle insert shown in FIGS. 1-5, rotated a few degrees from plan.
Figure 7:
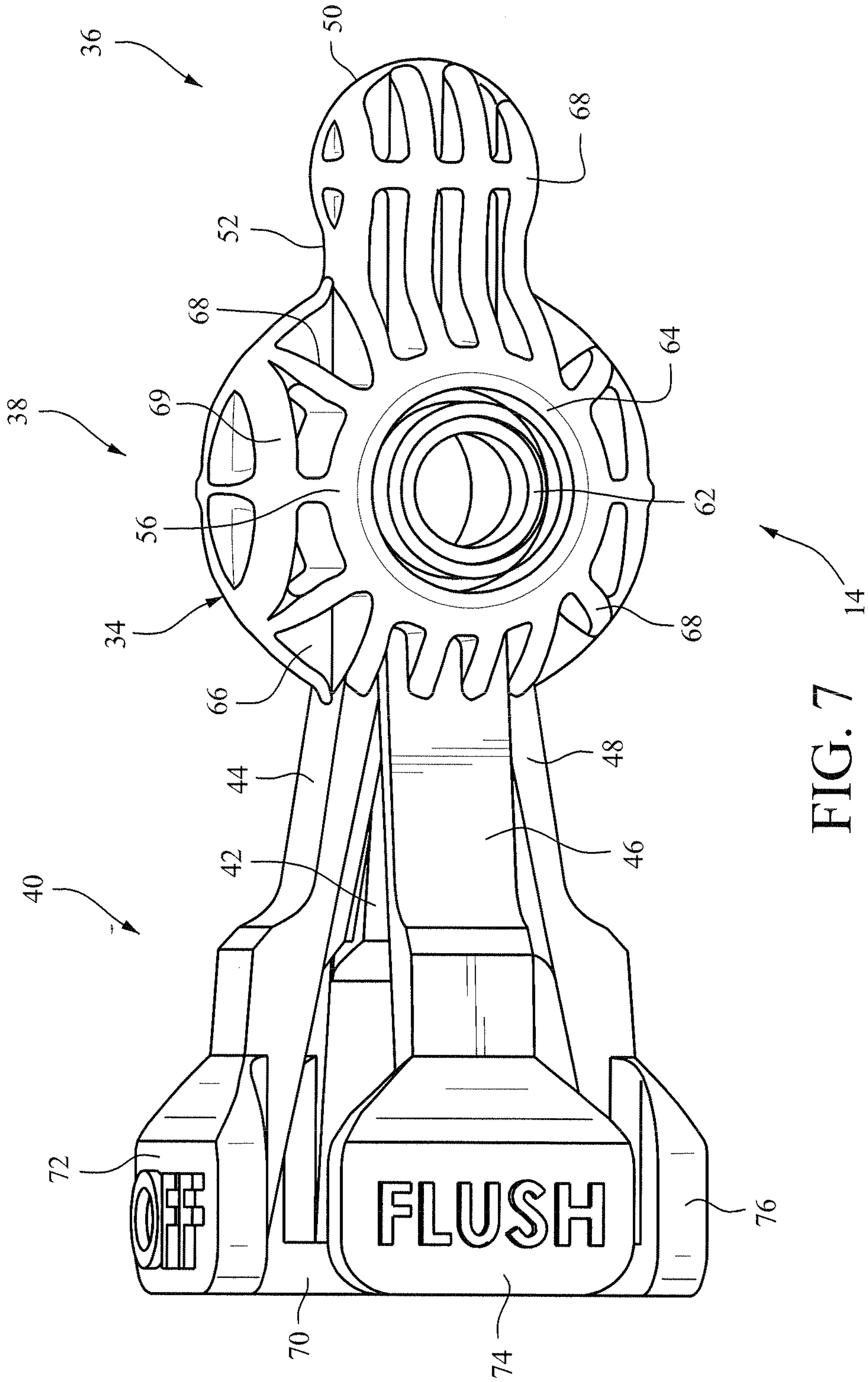
FIG. 7 is a bottom view of the nozzle insert shown in FIGS. 1-6, also rotated a few degrees from plan.
Figure 8:
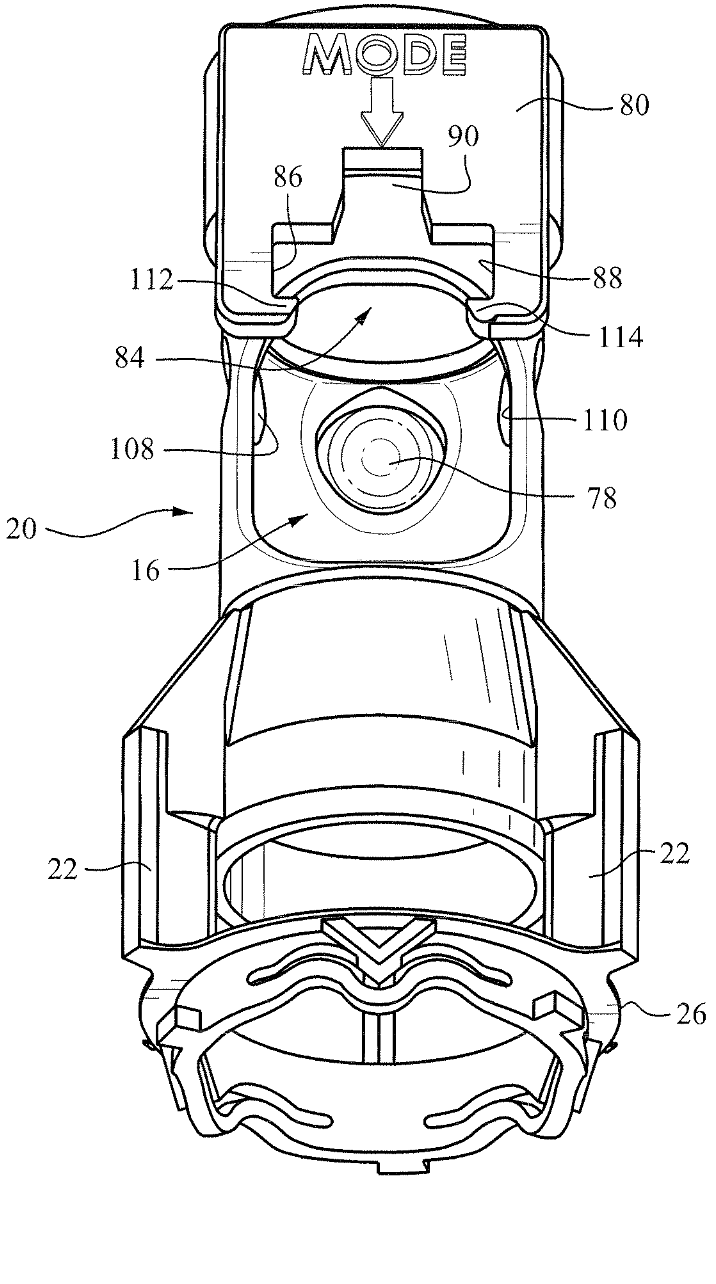
FIG. 8 is bottom, front perspective view of the sprinkler body alone, with the nozzle insert removed.
Figure 9:
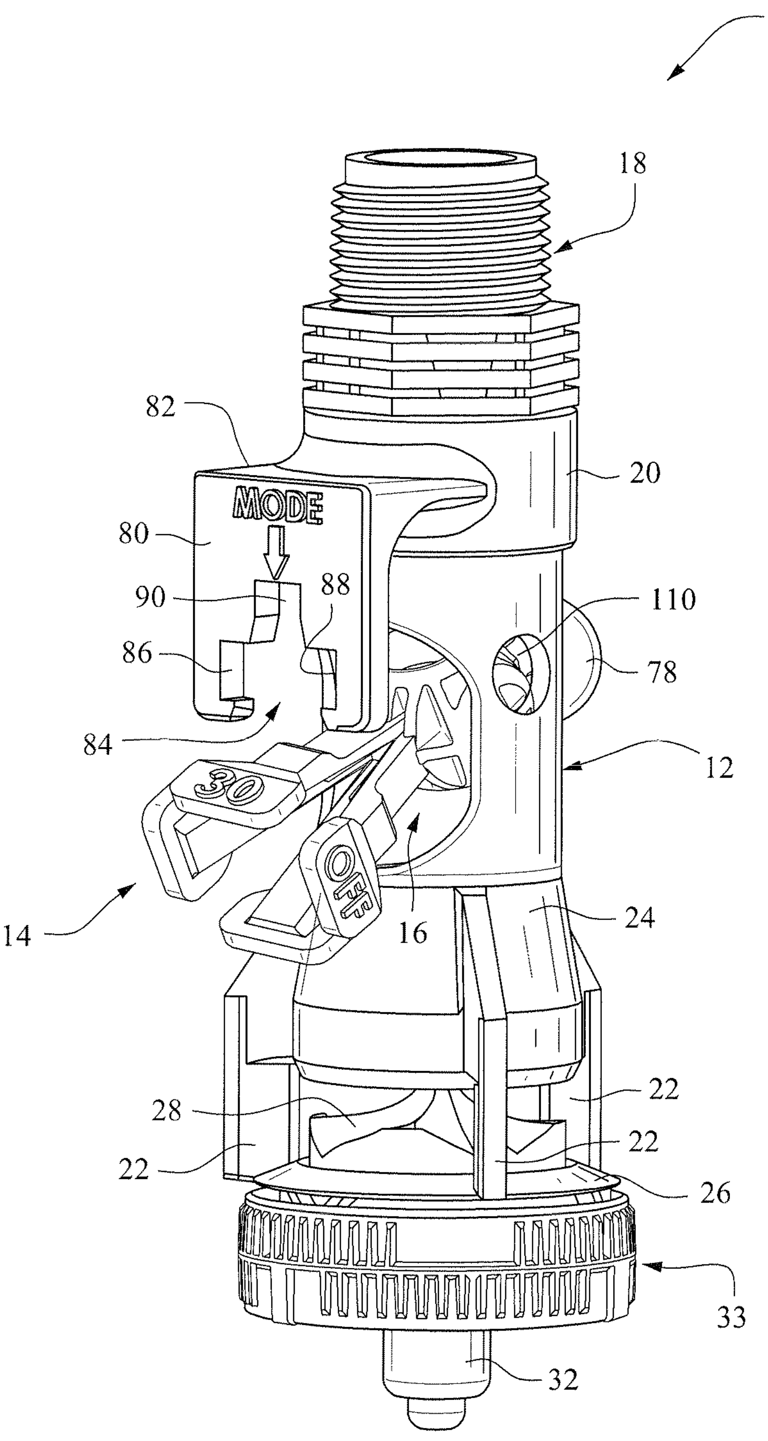
FIG. 9 is a perspective view similar to FIG. 3, but with the nozzle insert partially located within the sprinkler body.
Figure 10:
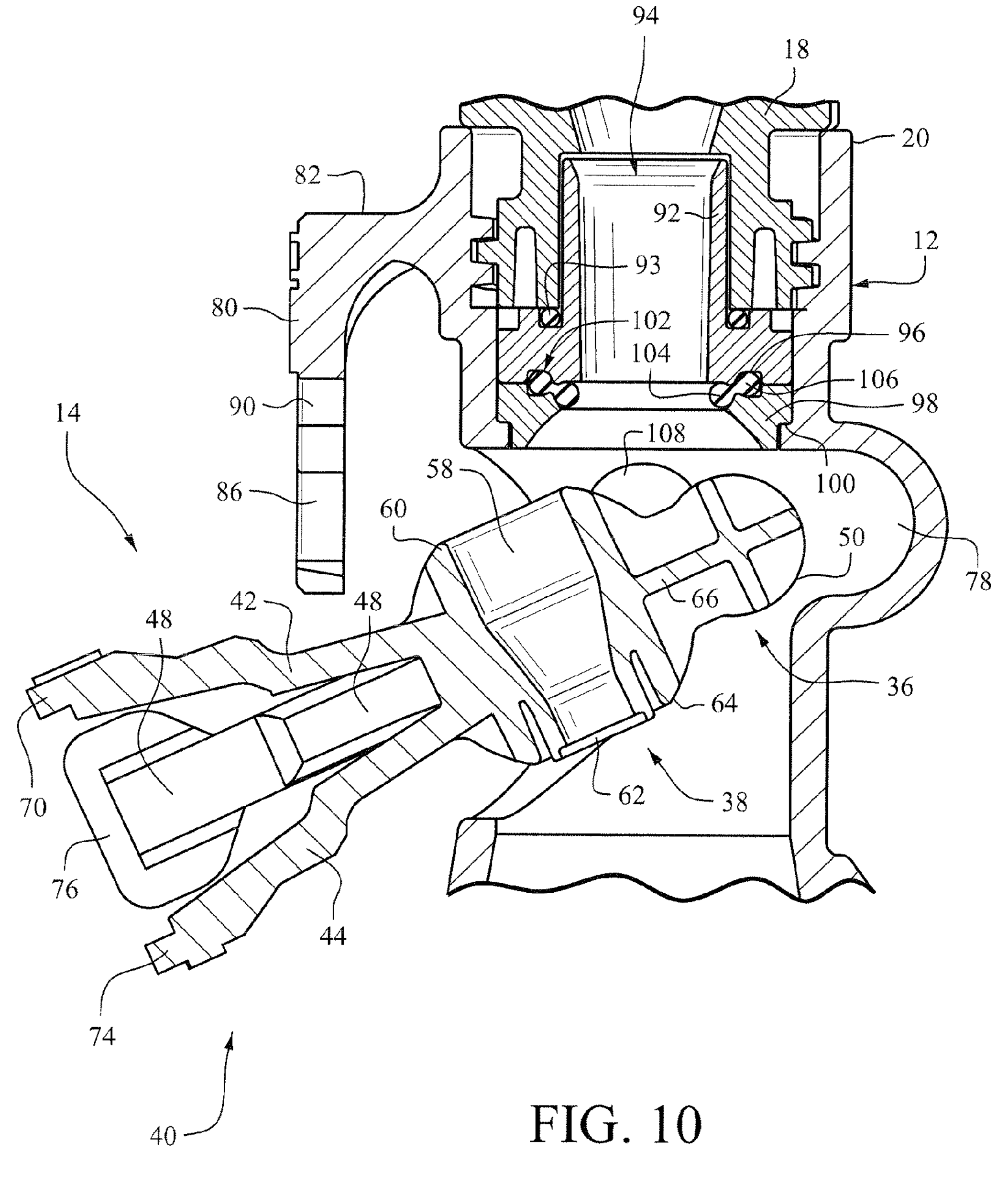
FIG. 10 is a vertical cross section of the sprinkler body and nozzle insert as shown in FIG. 9.
Figure 11:
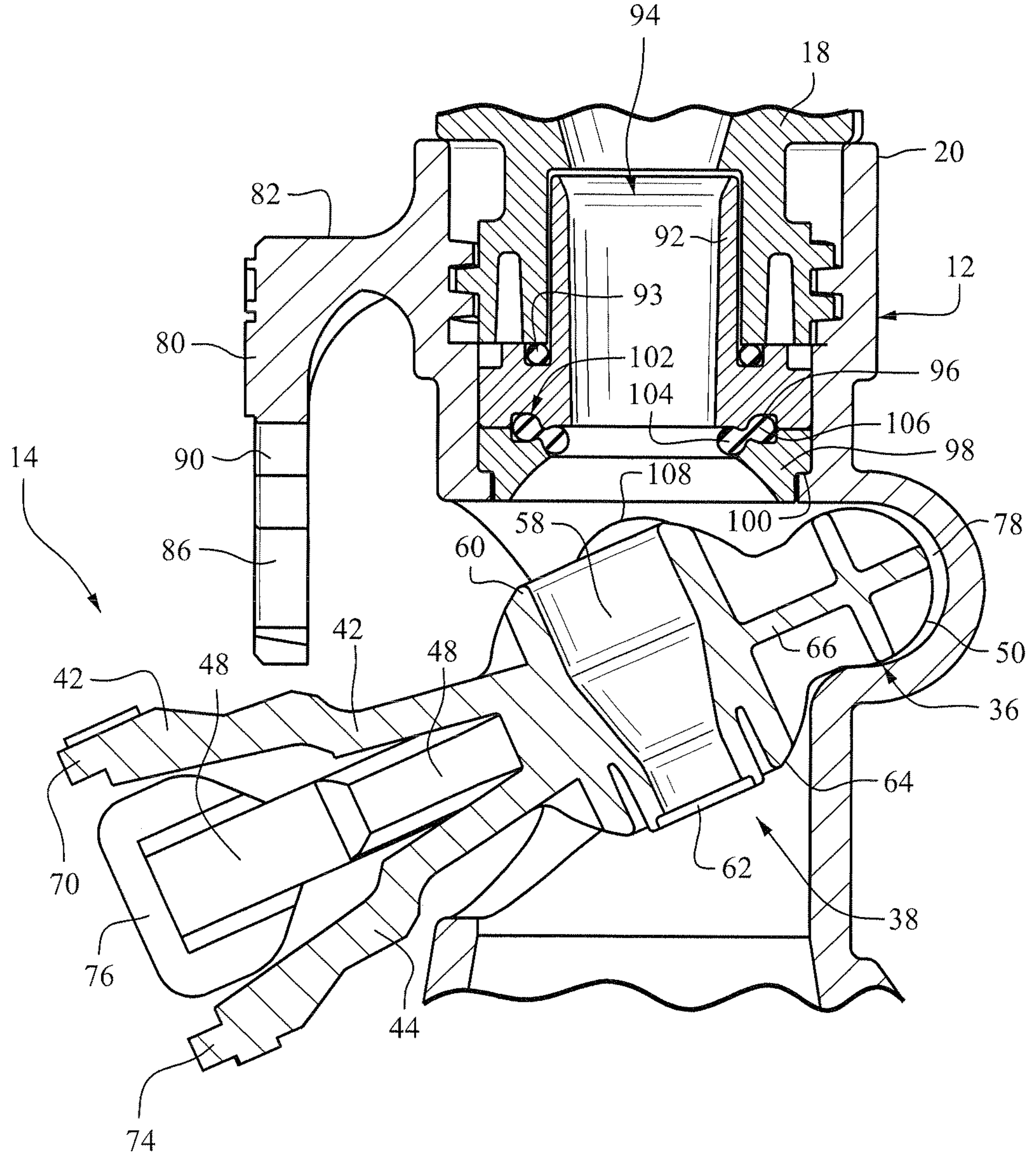
FIG. 11 is a vertical section view similar to FIG. 10, but showing the nozzle insert substantially fully inserted within the sprinkler body, but before locking into place.
Figure 12:
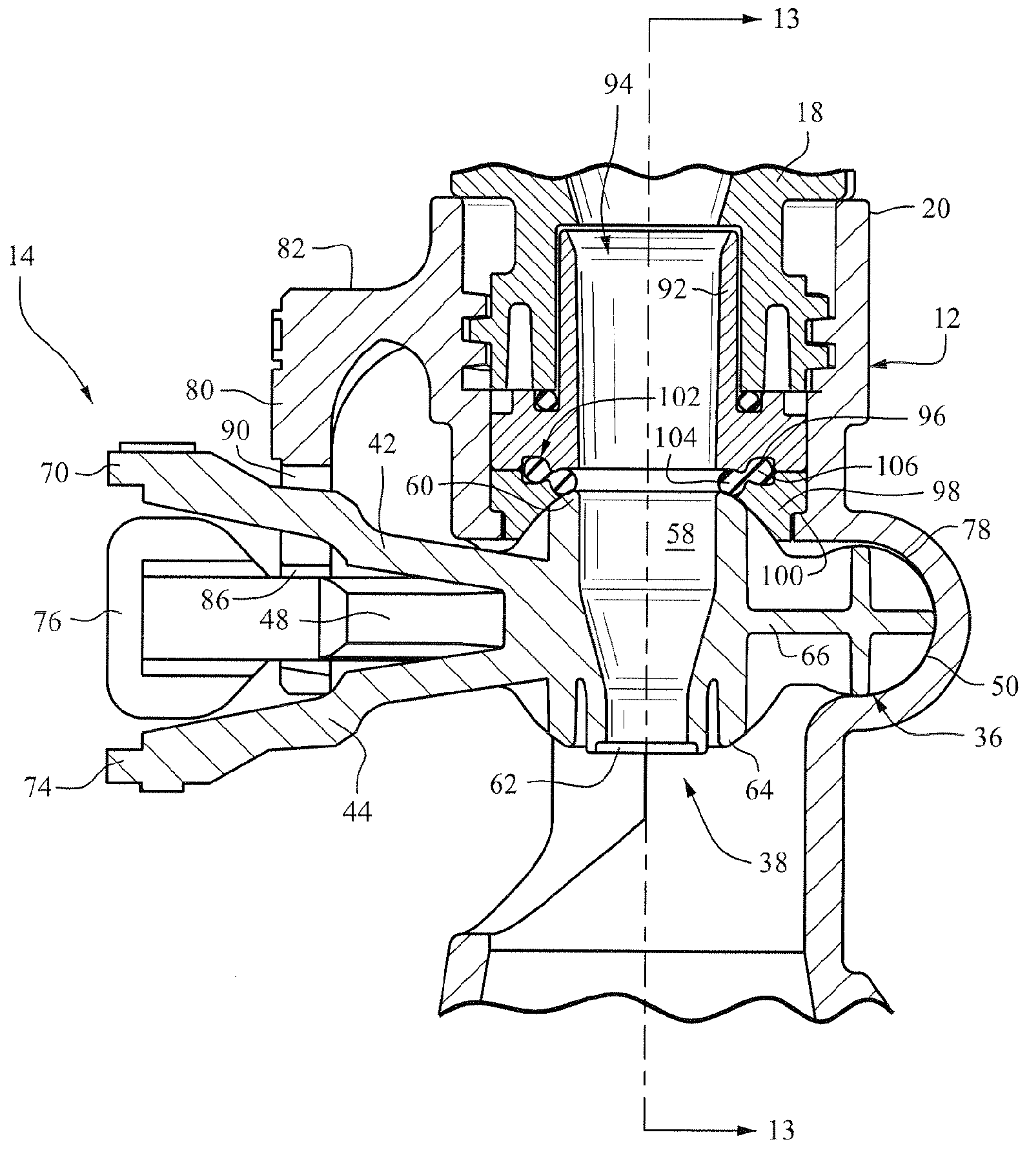
FIG. 12 is a vertical cross section similar to FIG. 11, but with the nozzle insert rotated upwardly into a locked position.

FIG. 3 illustrates the nozzle insert 14 ready for insertion within the access opening 16 of the sprinkler body 12 in the ON operating position, as confirmed by alignment of the spring arm 42 with slot 90 in the plate 80, and the nozzle size indicia "30" on squeeze tab 70 with the MODE indicia on the plate 80. Spring arms 44 and 48 are aligned with slots 88, 86, respectively. FIGS. 10 and 11 illustrate how the nozzle insert 14 is inserted into access opening 16. Specifically, the bearing portion 36 is seated in the bearing housing 78 in the side wall of the sprinkler body from below the plate 80. After locating the bearing surface 50 in the bearing housing 78, the now laterally-oriented spring arms 44 and 48 are squeezed inwardly via tabs 72, 76 to permit passage of the spring arms into the opening 84, and, while squeezing the tabs 72, 76, the insert is pivoted upwardly until the spring arm 42 is seated in slot 90 as shown in FIG. 12. The spring arms 44 and 48 are then released to spring into the respective laterally-oriented slots 88, 86. The spring force exerted by the spring arms 44 and 48, in combination with the flanged edges 112, 114 (FIGS. 3 and 8) bordering the entrance to the opening 84 which engage the lower edges of the spring arms 44, 48, retain the nozzle insert 14 in place in the selected operating position.

Figure 13:
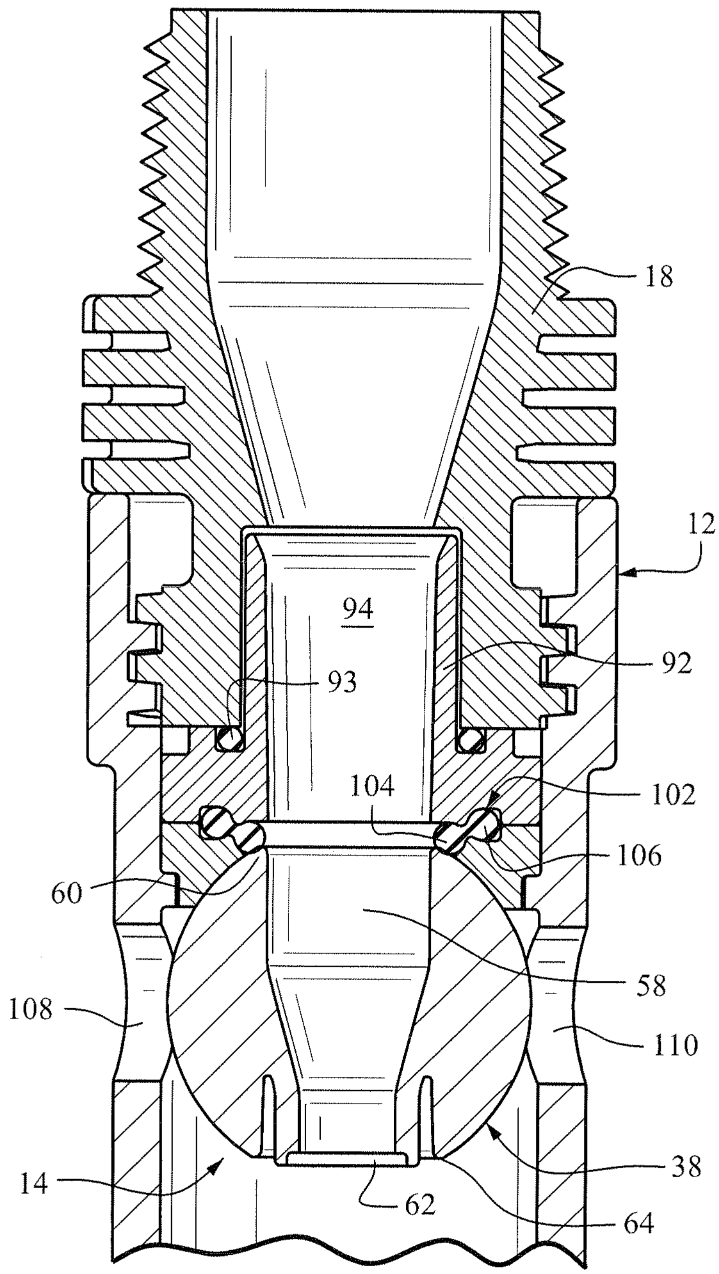
FIG. 13 is a vertical cross section of the sprinkler body and nozzle insert as shown in FIG. 12.
Figure 14:
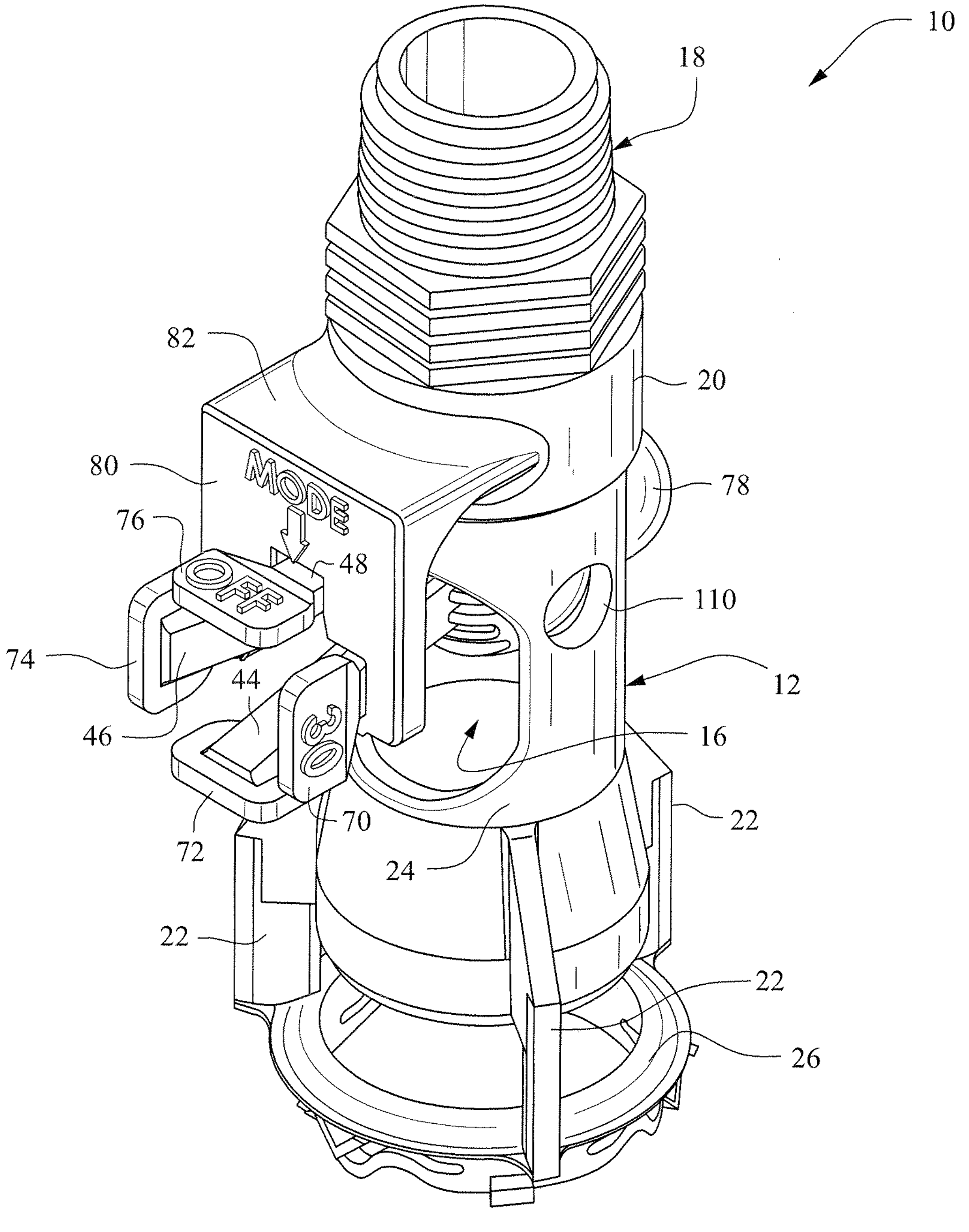
FIG. 14 is a perspective view of the sprinkler body and nozzle insert as shown in FIG. 1, but with the nozzle insert rotated 90 degrees in a clockwise direction to the OFF operating position and with the water deflection plate removed.
Figure 15:
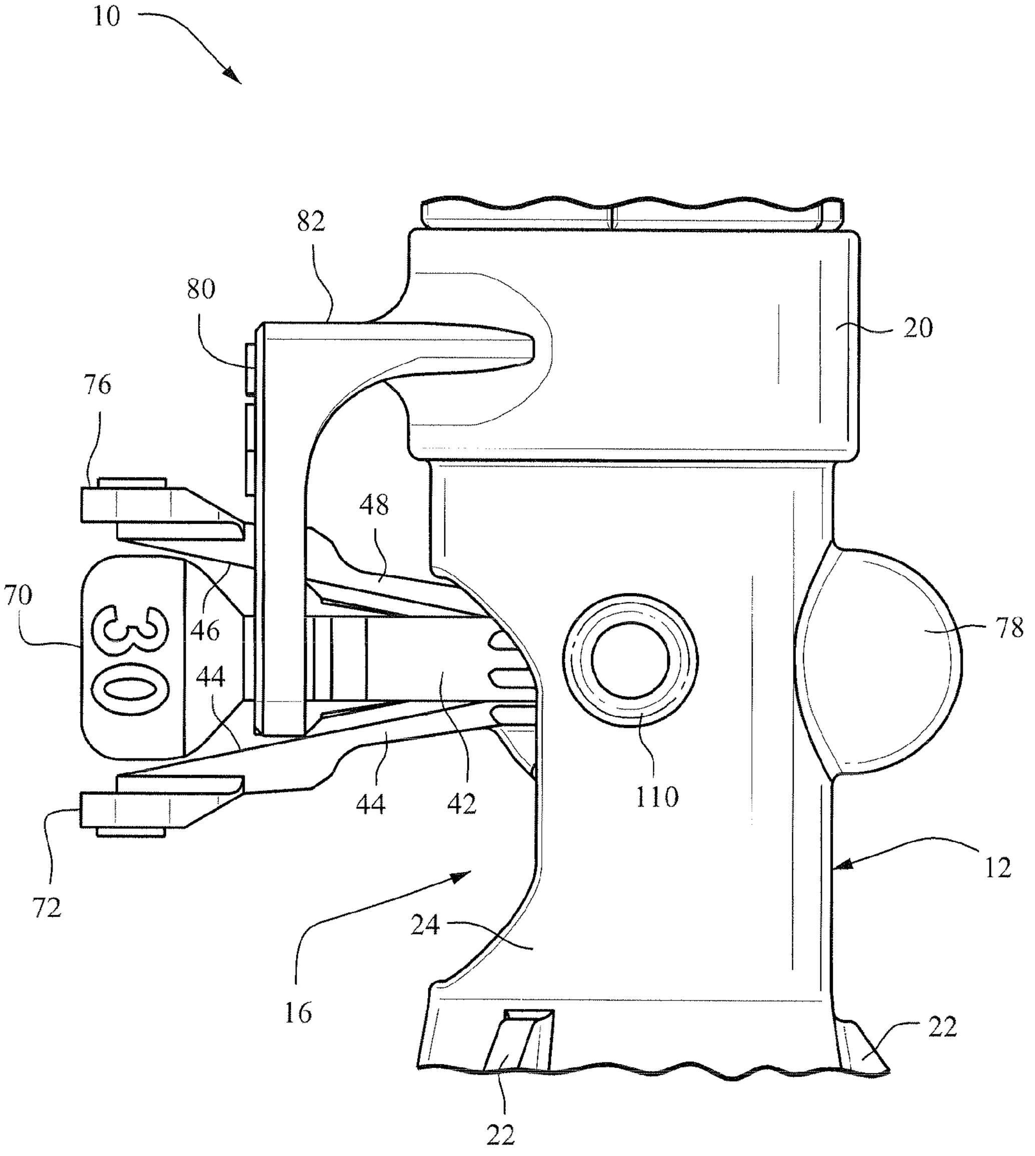
FIG. 15 is a partial side elevation of the sprinkler body and nozzle insert shown in FIG. 14.

As the nozzle insert 14 is pivoted upwardly into the ON operating position, the spherical surface surrounding the rim 60 at the inlet to the nozzle bore 58 also pivots upwardly into engagement with the inner ring 104 of the seal 102 to thereby seal the nozzle bore 58 relative to the sprinkler body flow passage 94 (FIG. 12). FIG. 13 illustrates the same ON operating position from the front of the sprinkler body, showing not only the seal interface between the spherical surfaces surrounding the nozzle bore rim 60 and sprinkler body flow passage 94, but also the solid portions of the ball-valve portion 38 relative to the side openings 108, 110 in the sprinkler body.

Figure 16:
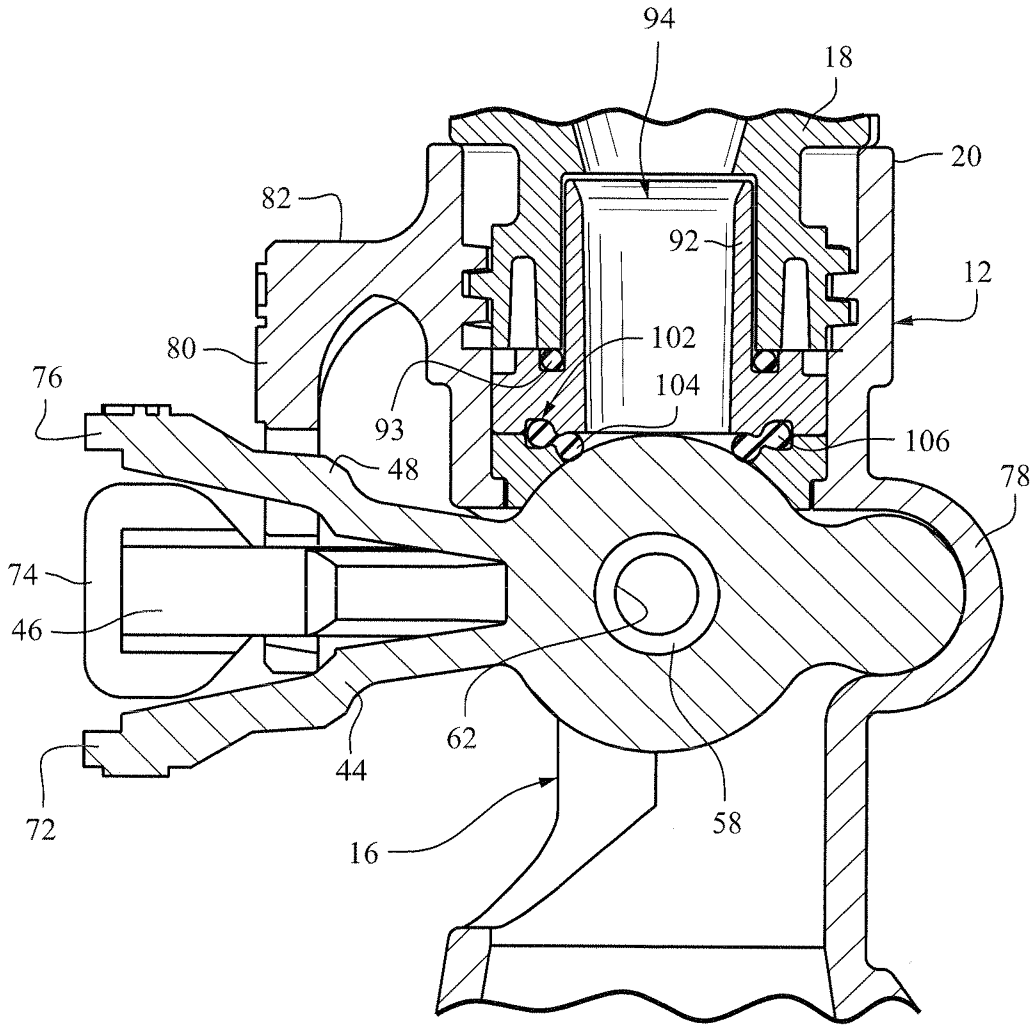
FIG. 16 is a vertical cross section of the sprinkler body and nozzle insert as shown in FIG. 15.
Figure 17:
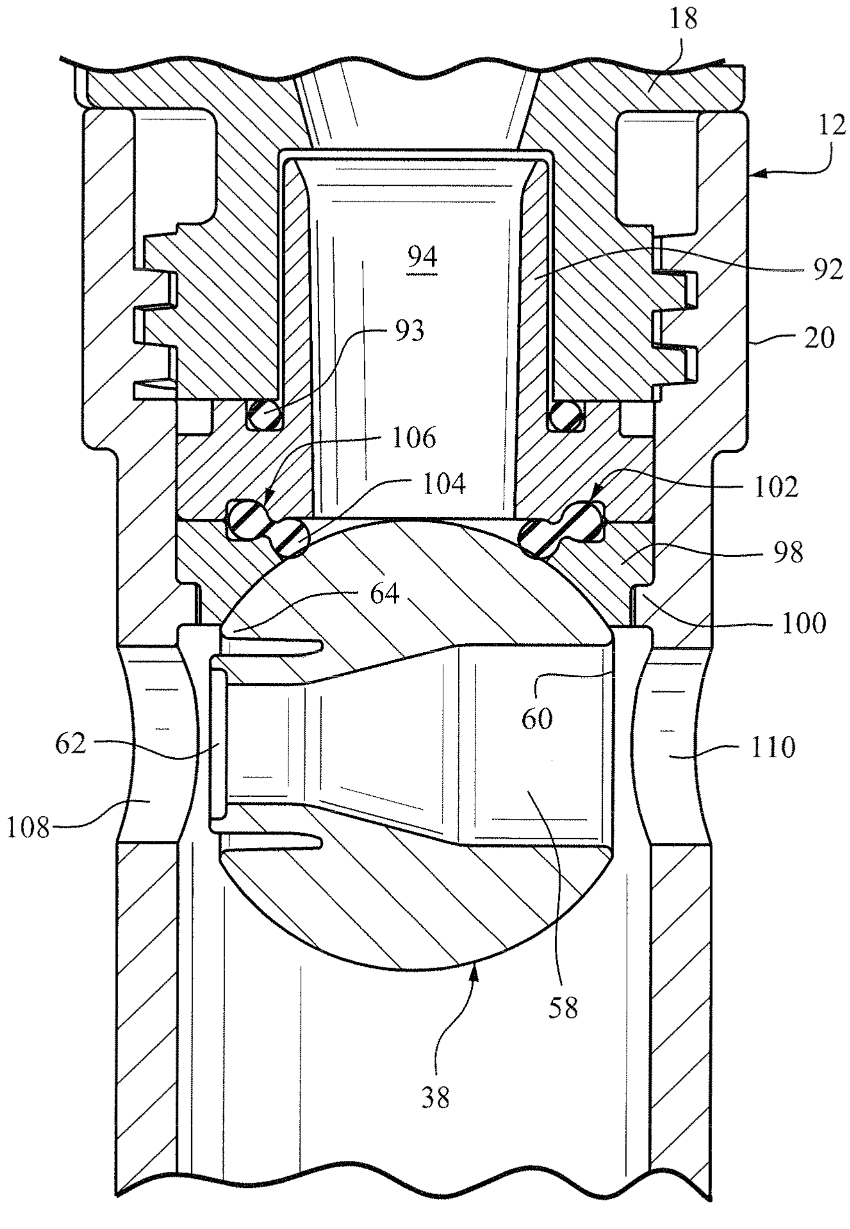
FIG. 17 is a vertical cross section taken through FIG. 15, but rotated 90 degrees about a vertical axis so as to be viewed from the front.

To release the nozzle insert 14 for rotation into a second selected operating position, the user merely need squeeze the tabs 72, 76 to free the spring arms 44, 48 from the slots 88 and 86, respectively, and pivot the insert 14 downwardly out of the opening 84 and back to the position shown in FIG. 11. The nozzle insert 14, with bearing surface 50 still engaged in the bearing housing 78, may now be rotated in a clockwise direction to one of the two available OFF operating positions, and while continuing to squeeze the tabs 70, 74 of spring arms 42, 46, pivoting the insert upwardly so that the spring arms 42, 46 are captured in the slots 88, 86 (FIGS. 14-17) in the same manner as previously described in connection with positioning the insert in the ON operating position. Now, however, the spring arm 48 is seated in the slot 90 and the OFF indicia on squeeze tab 76 is aligned with the MODE indicia on the plate 80. FIGS. 16 and 17 also illustrate how the seal 102 engages one of the annular ribs or surfaces 69 to seal the flow passage/nozzle insert interface and thus shut off all flow through the nozzle insert. In this OFF operating position, and as best seen in FIG. 17, the nozzle bore orifice 62 lies adjacent the sprinkler body opening 108 and the nozzle bore inlet 60 lies adjacent the sprinkler body opening 110, permitting manual cleaning of the nozzle bore 58.

Figure 18:
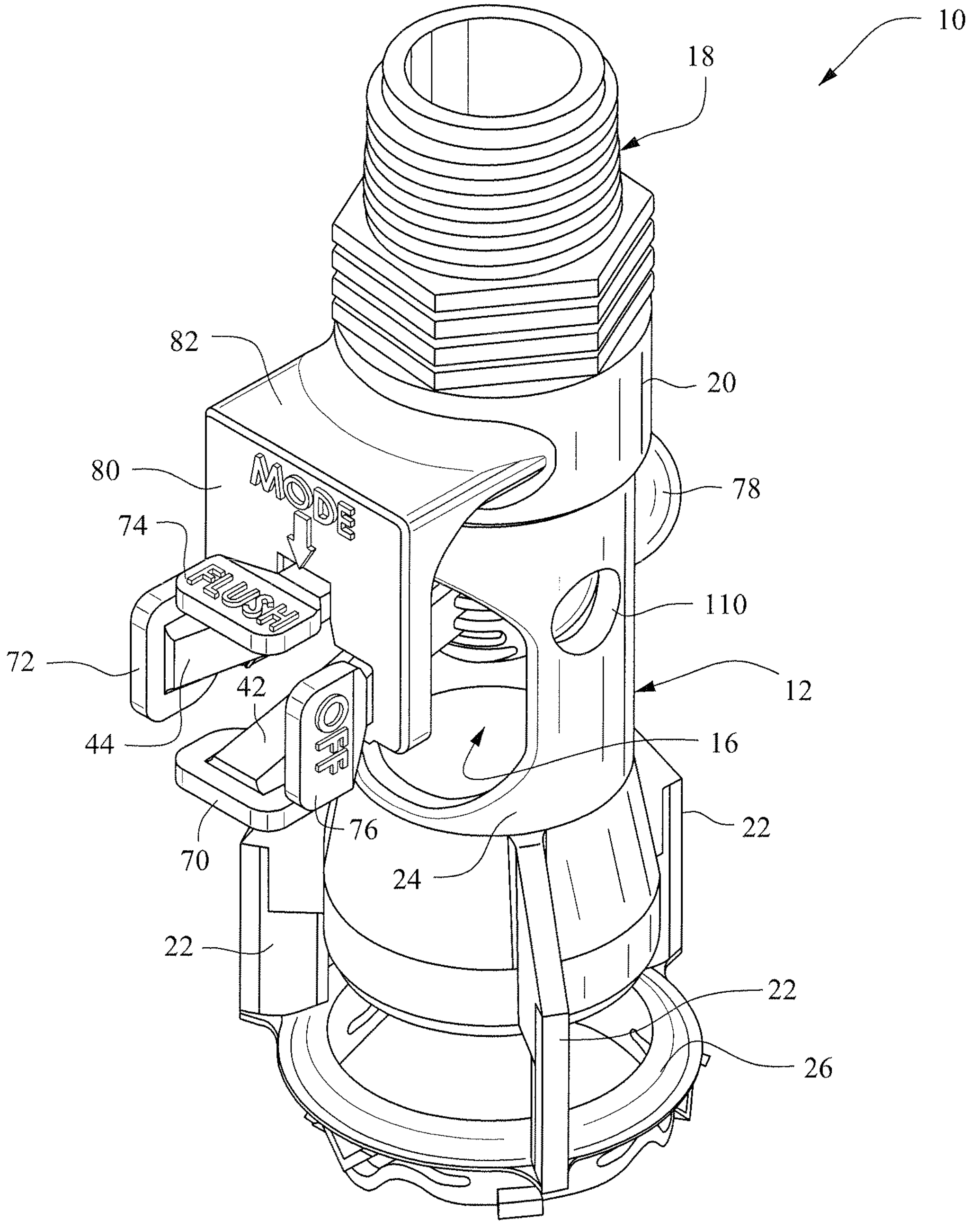
FIG. 18 is a perspective view of the sprinkler body and nozzle insert as shown in FIG. 14, but with the nozzle insert rotated an additional 90 degrees in a clockwise direction to the nozzle FLUSH position.
Figure 19:
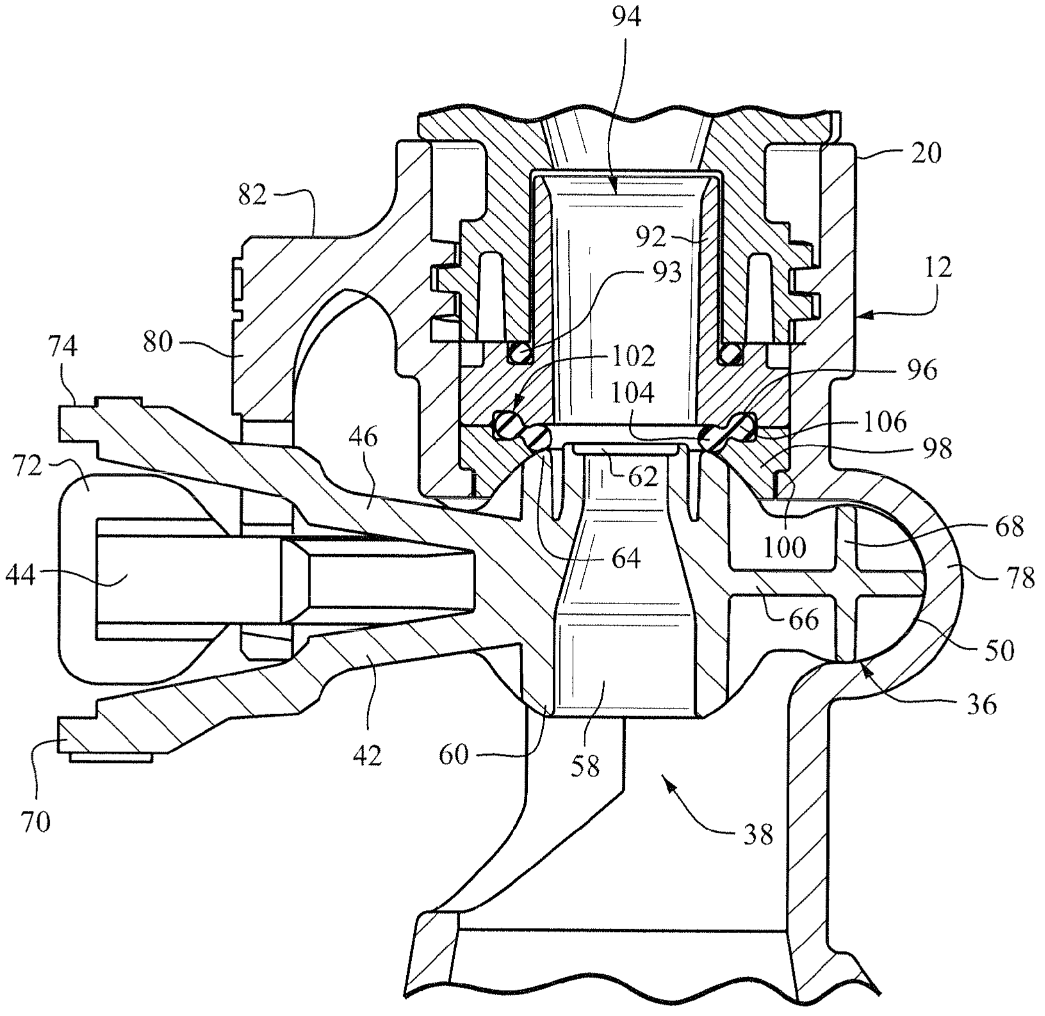
FIG. 19 is a partial vertical cross section taken through FIG. 18, but viewed from the right side.
Figure 20:
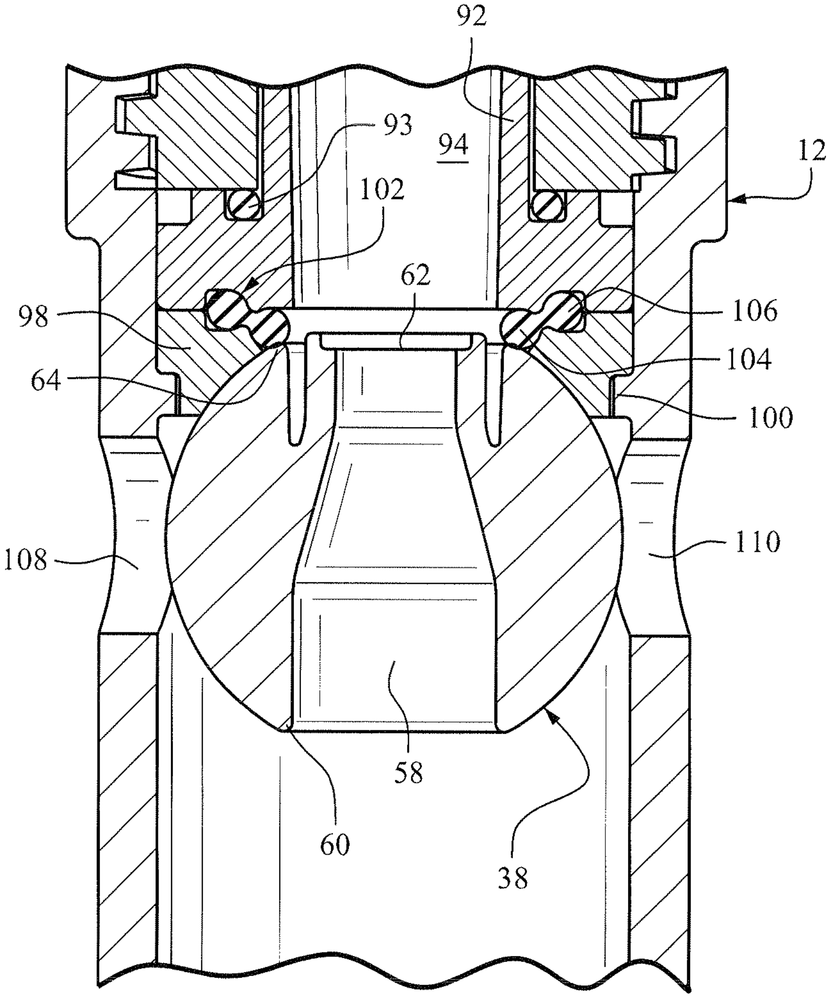
FIG. 20 is a vertical cross section similar to FIG. 19, but rotated 90 degrees about a vertical axis so as to be viewed from the front.

The same procedure described above is used to rotate the nozzle insert 14 an additional 90 degrees in the clockwise direction to the nozzle FLUSH operating position shown in FIGS. 18-20. In this position, spring arms 44, 48 are captured in slots 86, 88, respectively, and spring arm 46 is seated in slot 90. In the FLUSH operating position, the nozzle bore 58 is inverted relative to the ON operating position such that water from flow passage 94 first enters the nozzle orifice 62 and expands through the nozzle bore 58, exiting the larger inlet end defined by the rim 60.

It will be appreciated that the nozzle insert may be rotated 90 degrees further in the clockwise direction to a second nozzle OFF position where spring arms 42, 46 are captured in slots 86, 88, respectively, and spring arm 44 is seated in slot 90. Squeeze tab 72 is now aligned with the MODE indicia on plate 80, and the nozzle bore 58 is again substantially aligned with apertures 108, 110 in the sprinkler body, but reversed relative to the orientation shown in FIG. 17.

It will be understood that the nozzle insert construction permits rotation of the nozzle insert 14 in clockwise direction as described above, as well as in a counterclockwise direction (or any combination thereof) to locate the nozzle insert 14 in any desired operating position. At the same time, removal and replacement of an installed nozzle insert with another nozzle insert having a different orifice size is easily accomplished by a complete extraction of the nozzle insert 14 by squeezing the laterally-oriented tabs to release the respective spring arms from slots 86, 88, pivoting the insert 14 downwardly out of the opening 84, and removal of the insert from the access opening 16. The new nozzle insert can then be loaded into the sprinkler body following the installation procedure described above.

The various nozzle-insert-position-selection movements as described herein can be performed while the water supply remains on, and, as the nozzle insert 14 is pivoted downwardly out of its previously selected operating position, the flow passage 94 will be flushed of any debris lodged between the flow passage and the nozzle insert. It is also important to note that by pivoting the nozzle insert 14 away from the seal 102, rotation to a new operating position can be accomplished without any sliding friction between the seal and the nozzle insert. In each case, the engagement between the seal and nozzle insert is achieved during a simple upward pivoting motion of the nozzle insert that compresses the seal against the insert with minimal if any rotational or sliding friction.

It will also be appreciated that the described operating positions may be varied not only in terms of sequence, but also in terms of function. For example, it may be desirable to have a single OFF operating position, in which case, the second OFF operating position could be replaced by a LINE FLUSH operating position where a flush groove is formed on one of the solid sides of the ball-valve portion 38 ((for example, within or about the annular ribs 69), to thereby direct water from the flow passage 94 into the flush groove and then out of the sprinkler body when the nozzle insert is rotated to a position where the flush groove is aligned with the flow passage.

While the invention has been described in connection with what is presently considered to be the most practical and preferred embodiment, it is to be understood that the invention is not to be limited to the disclosed embodiment, but on the contrary, is intended to cover various modifications and equivalent arrangements.

What is claimed:

1. A nozzle insert for side-loading into an access opening in a sprinkler body comprising: an insert body having a bearing portion, a ball-valve portion connected to said bearing portion and provided with a nozzle bore having an inlet and an outlet orifice; and a lock/release portion connected to said ball-valve portion and including plural, flexible spring arms extending away from said ball-valve portion, said flexible spring arms being displaceable between a squeezed position and a released position, wherein said nozzle insert is insertable into a sprinkler body having a flow passage by displacement of said flexible spring arms into said squeezed position and rotatable to plural operating positions in the sprinkler body by manipulation of said flexible spring arms, and wherein said nozzle bore is alignable with the flow passage in at least two of said plural operating positions.

2. The nozzle insert of claim 1 wherein said ball-valve portion is a part-spherical ball-valve portion, and wherein said bearing portion, said part-spherical ball-valve portion and said lock/release portion are coaxially aligned, and said plural flexible spring arms extend angularly outwardly from said part-spherical ball-valve portion.

3. The nozzle insert of claim 2 wherein said plural, flexible spring arms comprise four, flexible spring arms spaced at 90-degree intervals.

4. The nozzle insert of claim 1 wherein said bearing portion has a part-spherical bearing surface.

5. A nozzle insert for side-loading into an access opening in a sprinkler body comprising: an insert body having a bearing portion, a ball-valve portion connected to said bearing portion and provided with a nozzle bore having an inlet and an outlet orifice; and a lock/release portion connected to said ball-valve portion and including plural, flexible spring arms extending away from said ball-valve portion, wherein said nozzle insert is insertable into a sprinkler body having a flow passage and rotatable to plural operating positions in the sprinkler body by manipulation of said spring arms, and wherein said nozzle bore is alignable with the flow passage in at least two of said plural operating positions, wherein said ball-valve portion is a part-spherical ball-valve portion, and wherein said bearing portion, said part-spherical ball-valve portion and said lock/release portion are coaxially aligned, and said plural flexible spring arms extend angularly outwardly from said part-spherical ball-valve portion, wherein said plural, flexible spring arms are provided with squeeze tabs at respective distal ends thereof.

6. The nozzle insert of claim 5 wherein said squeeze tabs are provided with operating-position indicia.

7. The nozzle insert of claim 1 wherein said bearing portion and said ball-valve portion are provided with an array of external shape-defining ribs.

8. A sprinkler and side-loading nozzle insert assembly comprising: a sprinkler body provided with a flow passage, a bearing housing in a side wall of said sprinkler body, and a nozzle insert received in an access opening formed in said side wall of said sprinkler body substantially opposite said bearing housing, said nozzle insert comprising an insert body having a bearing portion received in said bearing housing, a ball-valve portion provided with a nozzle bore having an inlet and an outlet orifice, said ball-valve portion connected to said bearing portion, and a lock/release portion connected to said ball-valve portion, said lock/release portion including plural, flexible spring arms extending away from said ball-valve portion, said flexible spring arms being displaceable between a squeezed position and a released position; wherein said nozzle insert is rotatable to plural operating positions by manipulation of said spring arms into said squeezed position, and wherein said nozzle bore is alignable with said flow passage in at least two of said plural operating positions.

9. The sprinkler and side-loading nozzle insert assembly according to claim 8 wherein said bearing portion, said ball-valve portion and said lock/release portion are coaxially aligned, and said plural flexible spring arms extend angularly outwardly from said ball-valve portion.

10. The sprinkler and side-loading nozzle insert assembly of claim 9 wherein said plural, flexible spring arms comprise four, flexible spring arms spaced at 90-degree intervals.

11. The sprinkler and side-loading nozzle insert assembly of claim 10 wherein said plural, flexible spring arms are provided with squeeze tabs at respective distal ends thereof.

12. The sprinkler and side-loading nozzle insert assembly of claim 8 wherein said bearing portion has a part-spherical surface engaged with a complementary surface in said bearing housing.

13. The sprinkler and side-loading nozzle insert assembly of claim 8 wherein said plural operating positions comprise four operating positions including a nozzle ON operating position where said inlet of said nozzle bore is aligned with said flow passage; and a first nozzle OFF operating position where said flow passage is sealed relative to a first surface on said nozzle insert.

14. The sprinkler and side-loading nozzle insert assembly of claim 13 wherein said plural operating positions also include a FLUSH operating position where said nozzle bore is aligned with said flow passage but inverted relative to said ON operating position.

15. The sprinkler and side-loading nozzle insert assembly of claim 14 wherein said plural operating positions include a second nozzle OFF operating position where said flow passage is sealed relative to a second surface on said nozzle insert.

16. A sprinkler and side-loading nozzle insert assembly comprising: a sprinkler body provided with a flow passage, a bearing housing in a side wall of said sprinkler body, and a nozzle insert received in an access opening formed in said side wall of said sprinkler body substantially opposite said bearing housing, said nozzle insert comprising an insert body having a bearing portion received in said bearing housing, a ball-valve portion provided with a nozzle bore having an inlet and an outlet orifice, said ball-valve portion connected to said bearing portion, and a lock/release portion connected to said ball-valve portion, said lock/release portion including plural, flexible spring arms extending away from said ball-valve portion; wherein said nozzle insert is rotatable to plural operating positions by manipulation of said spring arms, and wherein said nozzle bore is alignable with said flow passage in at least two of said plural operating positions, wherein said sprinkler body is provided with a plate spaced from said access opening and formed with a multi-pronged opening including plural slots, each arranged to receive any one of said plural flexible spring arms.

17. The sprinkler and side-loading nozzle insert assembly of claim 15 wherein said sprinkler body is provided with a plate spaced from said access opening and formed with a multi-pronged opening including three slots arranged to receive three of said four spring arms.

18. The sprinkler and side-loading nozzle insert assembly of claim 17 wherein said four spring arms are arranged relative to said ball-valve portion so as to correspond to said four operating positions and wherein said three slots are arranged to receive three of said four flexible spring arms in each of said four operating positions.

19. The sprinkler and side-loading nozzle insert assembly of claim 18 wherein said opening is sized to require squeezing of two laterally aligned ones of said four flexible spring arms to permit passage of said spring arms through said opening, and subsequent spring-biasing of said two laterally aligned ones of said four flexible spring arms into two laterally-aligned ones of said three slots.

20. The sprinkler and side-loading nozzle insert assembly of claim 19 wherein a third of said three slots is oriented vertically above and between said two laterally aligned slots and receives the spring arm corresponding to the selected one of said four operating positions.

21. The sprinkler and side-loading nozzle insert assembly of claim 15 wherein said sprinkler body is provided with a flexible seal at an outlet end of said flow passage, said seal engageable with said nozzle insert in each of said four operating positions.

22. A sprinkler and side-loading nozzle insert assembly comprising: a sprinkler body provided with a flow passage, a bearing housing in a side wall of said sprinkler body, and a nozzle insert received in an access opening formed in said side wall of said sprinkler body substantially opposite said bearing housing, said nozzle insert comprising an insert body having a bearing portion received in said bearing housing, a ball-valve portion provided with a nozzle bore having an inlet and an outlet orifice, said ball-valve portion connected to said bearing portion, and a lock/release portion connected to said ball-valve portion, said lock/release portion including plural, flexible spring arms extending away from said ball-valve portion; wherein said nozzle insert is rotatable to plural operating positions by manipulation of said spring arms, and wherein said nozzle bore is alignable with said flow passage in at least two of said plural operating positions, wherein said inlet orifice is diametrically-opposed to said outlet orifice, the nozzle bore including diametrically opposed solid surfaces, wherein said nozzle insert is received in said side wall of the sprinkler body at an acute angle relative to an axis of said flow passage and is pivotable upwardly into a releasably locked position with said ball-valve portion oriented relative to said flow passage in any one of said plural operating positions, said plural operating positions comprising four operating positions including a nozzle ON operating position where said nozzle inlet is located adjacent said flow passage, a nozzle FLUSH operating position where said outlet orifice is located adjacent said flow passage, and at least one nozzle OFF operating position where one of said diametrically-opposed solid surfaces is located adjacent said flow passage.

* * * * *